US012340505B2

(12) United States Patent
Amthor et al.

(10) Patent No.: US 12,340,505 B2
(45) Date of Patent: Jun. 24, 2025

(54) MICROSCOPY SYSTEM AND METHOD FOR CHECKING INPUT DATA

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 585 days.

(21) Appl. No.: 17/493,980

(22) Filed: Oct. 5, 2021

(65) Prior Publication Data
US 2022/0114725 A1 Apr. 14, 2022

(30) Foreign Application Priority Data
Oct. 9, 2020 (DE) ...................... 10 2020 126 554.9

(51) Int. Cl.
*G06T 7/00* (2017.01)
*G06F 18/214* (2023.01)
(52) U.S. Cl.
CPC .......... *G06T 7/0012* (2013.01); *G06F 18/214* (2023.01); *G06T 7/0002* (2013.01); *G06T 2207/10056* (2013.01); *G06T 2207/20081* (2013.01); *G06T 2207/30168* (2013.01)
(58) Field of Classification Search
CPC ......... G06T 7/0012; G06T 2207/30168; G06T 2207/20081; G06T 2207/10056; G06T 2207/20084; G06T 2207/30024; G06F 18/214; G06V 10/82; G06V 20/69
See application file for complete search history.

(56) References Cited

U.S. PATENT DOCUMENTS

| 5,893,095 | A | * | 4/1999 | Jain ...................... G06F 16/5838 |
| 2018/0012082 | A1 | * | 1/2018 | Satazoda .............. G06V 10/763 |
| 2019/0266726 | A1 | * | 8/2019 | Madabhushi ........... G06T 5/002 |
| 2020/0202508 | A1 | | 6/2020 | Amthor et al. |

(Continued)

FOREIGN PATENT DOCUMENTS

| CA | 2641355 A1 * | 8/2007 | ............. G06K 9/036 |
| DE | 102018133196 A1 | 6/2020 | |

(Continued)

OTHER PUBLICATIONS

U.S. Appl. No. 62/957,517 corresponding to Sue et al. (US 2021/0209760 A1), filed on Jan. 6, 2020 (13 pages) (Year : 2020).*

(Continued)

*Primary Examiner* — Dino Kujundzic
(74) *Attorney, Agent, or Firm* — LaBatt, LLC

(57) ABSTRACT

A microscopy system comprises a microscope configured to capture raw data and a computing device configured to derive at least one microscope image from the raw data and to run a processing program for processing the microscope image. The computing device is configured to first supply a microscope image which is to be processed with the processing program to a checking program, which checks the supplied microscope image with respect to an evaluation criterion predefined for the processing program. The microscope image is only transmitted to the processing program in the event of a positive checking result.

22 Claims, 7 Drawing Sheets

(56) References Cited

U.S. PATENT DOCUMENTS

2020/0371333 A1    11/2020  Amthor et al.
2021/0209760 A1*    7/2021  Sue ........................ G16H 50/20

FOREIGN PATENT DOCUMENTS

DE          102019114012 A1    11/2020
EP              4261775 A1 *   10/2023    ........... G06F 18/214

OTHER PUBLICATIONS

T. Zhang et al., "SlideNet: Fast and Accurate Slide Quality Assessment Based on Deep Neural Networks," 2018 24th International Conference on Pattern Recognition (ICPR), Beijing, China, 2018, pp. 2314-2319. (Year: 2018).*
S. Koho et al., "Image Quality Ranking Method for Microscopy," Scientific Reports 6:28962, 2016. (Year: 2016).*
M. S. Hosseini, et al., "Focus Quality Assessment of High-Throughput Whole Slide Imaging in Digital Pathology," IEEE Transactions on Medical Imaging, vol. 39, No. 1, pp. 62-74, Jan. 2020. (Year: 2020).*
Hofmeister, DE Application No. 102020126554.9, Search Report, Jun. 25, 2021, 9 pages (no English translation provided).

* cited by examiner

MICROSCOPY SYSTEM AND METHOD FOR CHECKING INPUT DATA

REFERENCE TO RELATED APPLICATIONS

The current application claims the benefit of German Patent Application No. 10 2020 126 554.9, filed on 9 Oct. 2020, which is hereby incorporated by reference.

FIELD OF THE DISCLOSURE

The present disclosure relates to microscopy systems and methods for checking input data, in particular input images of an image processing program or training images for a machine learning program.

BACKGROUND OF THE DISCLOSURE

Automation and user comfort are playing an increasingly important role in modern microscopy systems and other measuring devices, and the significance of (image) processing programs is growing accordingly. A microscopy system is expected, for example, to detect, navigate and subject a sample of interest to further analysis in a largely automated manner. To this end, a user is presented with an overview or navigation map in which the user can select a location based on which a motorized sample stage can then be automatically positioned to examine the selected location with a higher magnification. An automatic sample detection can also be utilized for the purposes of collision prevention by defining allowed areas of movement for motorized microscope components based on the detected sample or detected sample carrier. An at least partially automated assessment of captured sample images should also be possible, for example by detecting certain sample structures, counting biological cells or stitching a plurality of partial images into an aggregate image. At least one overview image or microscopic sample image is analyzed by different image processing programs for these applications.

A generic microscopy system accordingly comprises a microscope configured to capture raw data and a computing device. The computing device is configured to form at least one microscope image from the raw data and to run a processing program for processing the microscope image.

The importance of machine learning models for image processing is growing, in particular for image segmentation, classification and detection of particular objects or structures. Such a model is learned using training data and should generate good results so long as input data resembles the training data to an adequate degree. An erroneous image processing result can have serious consequences, for example a series of measurements can be rendered collectively useless by a single error or a collision that damages a microscope component or the sample can occur if the image processing result is used for controlling components or as a navigation map. Generally speaking, comparable problems caused by erroneous processing results also arise with measuring devices when other raw data or measurement data derived from the same is processed and analyzed instead of image data.

To counter these problems, the Applicant developed a verification model—which is described in DE 10 2019 114 012—to which an image processing result is fed. The verification model can be a model learned using training data, the training data containing, e.g., image processing results that are labelled as correct or incorrect. By means of such a training, the verification model is able to identify erroneous image processing results with a high degree of reliability. In the event of erroneous image processing results, subsequent component control operations or image analyses are stopped.

In a further aspect, the invention relates to a microscopy system for generating and checking training images. A generic microscopy system comprises a microscope configured to capture raw data and a computing device configured to form at least one microscope image from the raw data and to incorporate/include said at least one microscope image in training images of a machine learning program. In particular, this allows a microscope user to supplement previous training images, which in turn allows processing steps of a machine learning program, which essentially result from the underlying training images, to be adapted to the measurement situation of the microscope user. For example, microscope images can be added for novel samples, sample carriers or image capture parameters, together with associated target images or other annotations. For example, a microscope user can capture two images of the same sample, one with a low and one with a high illumination intensity. For training images of a denoising model, the image with the low illumination intensity can be an input image of training data and the image captured with the high illumination intensity can be an associated target image. A model can thus be learned that maps an input image with a low illumination (and thus higher levels of image noise) to an image with reduced levels of image noise. If a microscope user adds unsuitable microscope images to the training images, however, the machine learning program will not be able to achieve high-quality results. The demands placed on the microscope user to ensure that only suitable data is provided for the training of the machine learning program are thus relatively high.

It can be considered an object of the invention to provide a microscopy system and a method with which erroneous processing results from input data are prevented in a manner that is particularly reliable and efficient.

SUMMARY OF THE DISCLOSURE

This object is achieved by the microscopy systems with the features of claim 1 or claim 21 and by the method with the features of claim 2.

According to the invention, in the microscopy system of the aforementioned type, the computing device is configured to first supply/feed a microscope image which is to be processed with the processing program to a checking program. The checking program is configured to check the supplied microscope image with respect to an evaluation criterion predefined for the processing program. In the event of a positive checking result, the microscope image is transmitted to the processing program; in the event of a negative checking result, the microscope image is not transmitted to the processing program.

In a method for checking input data according to the invention, input data to be processed with a processing program is first fed to a checking program. The checking program checks the input data with respect to an evaluation criterion predefined for the processing program. In the event of a positive checking result, the input data is transmitted to the processing program; in the event of a negative checking result, the input data is not transmitted to the processing program.

The checking program largely ensures that input data or a microscope image is only fed to a processing program when correct processing results can be expected. This not only prevents erroneous processing results, but also makes it possible to detect problematic situations earlier and abstain from unnecessary time-consuming or computationally intensive processes of the processing program. The problematic situation brought about by an erroneous (image) processing result can thus often be precluded. An evaluation criterion is tailored to the subsequent processing program so as to permit an apt evaluation for this program.

Optional Designs

Advantageous variants of the microscopy system according to the invention and of the method according to the invention are the object of the dependent claims and are explained in the following.

Input Data for the Checking Program

Input data of the checking program is data that is to be subsequently processed with the processing program. The input data can thus comprise a microscope image, which is to be understood in the sense of at least one microscope image since, depending on the processing program, a plurality of microscope images can also be evaluated together to render checking more efficient. Forming a microscope image from captured raw data can mean that the microscope image is calculated from the raw data or, if the raw data represents image data directly, that the raw data is used as the microscope image. In the sense of the present disclosure, a microscope image can also be calculated from one or more images and constitute, for example, a segmentation mask. Input data of the checking program can in particular be raw data captured by a measuring device or processed measurement data. Besides image data, e.g., spectral data, video data, audio data or text data can form the input data.

Image Processing Program

In different variant embodiments, the processing program is an image processing program. The input data is accordingly at least one image or microscope image. A microscope image can be a sample image, i.e. a microscopic image of a sample captured with a system camera/microscope camera. A microscope image can also be an overview image or a macroscopic image of a sample, e.g., captured via an overview objective or an overview camera, or a macroscopic image of a sample carrier, e.g., captured with an overview camera.

The processing program can in particular be configured for one or more of the following processing operations:

a calculation or enhancement of input images, for example: a denoising, whereby an output image is generated with the same content as the input image but with reduced image noise; a deconvolution of an input image, wherein in particular a deconvolution of a sample image is calculated in terms of the associated PSF (point spread function), which describes the optical system used to capture the sample image in order to obtain a deconvolved image with a higher resolution/image quality; a calculation of a high resolution, which calculates an output image with a higher resolution from an input image; a processing of an input image captured by means of compressed sensing with defective areas or gaps, wherein a complete image of, e.g., a sample is output without defective areas; a mapping of the microscope image to another microscopy contrast technique (virtual staining), wherein, e.g., an input image is an image of a sample captured with a bright-field contrast and an output corresponds to a sample image with a fluorescence contrast; or an image enhancement by means of, e.g., an artefact removal or background removal;

an analysis of the input image, in particular a segmentation of an input microscope image, wherein the output is a segmentation/binary mask which labels particular structures, e.g., sample, slide and/or sample carrier; a classification, wherein an assignment of classes is calculated for an input microscope image, the classes describing a certain characteristic, e.g. a type of depicted structure or image capture characteristics; detection of structures depicted in the microscope image, wherein an output relates to a localization of particular structures in the microscope image with an optional determination of a class assignment; a counting of cells or predefined objects in the input image; or a determination of a cell density or confluence from an input image.

Image processing programs/algorithms are typically limited to a particular range of operation. For example, a denoising algorithm usually has a lower limit in terms of the signal-to-noise ratio (SNR). Input images with higher noise levels cannot be denoised without restricting the functionality of the algorithm. This limitation applies analogously to image processing programs designed for analysis. A segmentation algorithm for cells of a specific type can typically fail when analyzing a different cell type. Moreover, samples generally have to be cleaned adequately and may not exhibit crystal formation in order for the segmentation to be able to be calculated without error.

The image processing program can use a trained machine learning model to calculate the image processing, in particular for the examples cited above. The limits of a trained model cannot always be realistically assessed by a user. If it is fed with an input image outside an envisaged or allowable range of operation, a machine learning model can generate, e.g., erroneous classifications or erroneous segmentation masks. A denoising algorithm can create strong artefacts if the image is too noisy or detect objects that are not actually in the input image. If the output image is only checked with an image processing program for denoising, a good denoising might be determined, but it is not possible to reliably evaluate whether new objects have been fabricated. While image noise is very relevant for, e.g., high-resolution reconstruction and should thus not exceed a particular limit value, it is less important for other processing steps such as image segmentation and can accordingly be above the limit value. The evaluation criterion is thus defined depending on the image processing program.

Evaluation Criterion

An input image is evaluated by means of the evaluation criterion. This evaluation can also comprise a plurality of evaluations for subregions of the input image, as described later on in greater detail. The evaluation criterion can take into account one or more of the following aspects: a deviation of the input image/microscope image from known (microscope) images; image noise; a presence of artefacts in the input image; an image brightness; an illumination of the input image; or missing structures in the input image.

A deviation from reference images or predefined, known microscope images can indicate that the input image does not correspond to a type of image for which the image processing program is designed. This can be the case, for example, with a novel sample type or sample carrier type. An image processing program designed for segmentation can, e.g., generally only segment certain categories or classes of objects correctly. If a new category is determined as a deviation from reference images, the input image is classified as unsuitable for the image processing program.

In the case of image noise, a noise level can be calculated from the input image and subsequently compared with a predefined limit value. If the limit value is exceeded, the input image is evaluated as unsuitable.

Artefacts can relate to image errors caused at capture or by a preceding image processing, e.g., by a scanning rate that is too low, by reflections, dirt, defocused/out-of-focus imaging, image compression errors such as JPEG artefacts or moiré patterns.

If the evaluation criterion is an image brightness, an input image can be classified as unsuitable if it falls below a minimum value. The same applies to an illumination, wherein shadows or brightness distributions in different image regions can be assessed as a measure of an illumination.

Missing structures can be understood to mean, for example, that it is not possible to determine sample areas, cover slip edges or reference structures (e.g., screws, threaded holes, component contours or markers) to be assessed by the image processing program. This can be the consequence of, e.g., incorrectly set capture parameters such as a resolution that is too low or an unfavorable brightness.

Analogously, it is also possible to determine as an evaluation criterion whether particular predefined image content known to be unsuitable for the image processing program is contained in the microscope image. If this image content is detected, a negative checking result is output. In principle, predefined image content can relate to any structures, for example particular sample types, sample carrier types or markings. For example, if it is determined from an adhesive label or an imprinted model specification that the sample carrier type used is a slide with a cover slip, the microscope image can be classified as unsuitable for an image processing program that is designed to carry out a segmentation of wells of a microtiter plate in the microscope image.

Associated contextual data regarding the microscope image can also be entered into the checking program together with the microscope image. The contextual data can in particular relate to a sample type, a sample carrier type, capture parameters or system information. The checking program is designed to take into account the contextual data in the determination of a positive or negative checking result. If the checking program is based on a machine learning model, as described later on in greater detail, it is also possible to provide contextual data for corresponding training data of the machine learning model.

Checking Program as Learned Model

The checking program can comprise or be a trained machine learning model. The evaluation criterion is defined in this case by model parameter values of the machine learning model based on/derived from training data. The model parameter values can be defined or determined in the training in accordance with the evaluation criteria cited above, for example by specifying labels for training images in accordance with the evaluation criteria cited above. This allows the learned model to generate an output corresponding to an evaluation according to the evaluation criterion applied in the training.

The machine learning model can be formed by, e.g., one or more neural networks and comprise in particular a CNN (convolutional neural network). Model parameter values comprise entries of convolution matrices in this case. Deep-neural-network model architectures other than a CNN are also possible.

The machine learning model can be designed, for example, as an anomaly detector, in particular using a clustering technique or density estimation technique, or as a one-class classifier or autoencoder. The model can be trained or have been trained, e.g., in an unsupervised training using training data. In particular all training data or training images can constitute exploitable/suitable input data for the processing program in this case. An anomaly detector can determine if there is an input image that deviates more significantly from the training data, which is evaluated as an anomaly. The evaluation criterion of a deviation from reference data can be implemented thereby and the existence of a new category of sample carrier/sample inferred. Similarly, a one-class classifier is trained to determine whether an input image belongs to the same image class as the training images. An autoencoder is trained to generate an output resembling the input. A loss function, which describes a reconstruction error (deviation between the current output and the training image), can be minimized in the training to this end. It is possible to ensure by means of, e.g., a regularization or an appropriate (i.e. small enough) bottleneck layer that the autoencoder does not learn an identity function. If an input image is input into the ready-trained autoencoder, a reconstruction error between its output and the input image will be small in the event that the input image corresponds to a distribution of the training data (i.e. when the input image resembles the training data). A reconstruction error can thus be used as a measure for an anomaly detection. If the reconstruction error lies above a predefined threshold value, a negative checking result is output.

Alternatively, the machine learning model can be trained or have been trained in a supervised training using training data. A part of the training data can be labelled with a positive annotation indicating that the training data in question represents exploitable input data for the processing program. Conversely, another part of the training data can be labelled with a negative annotation indicating that the training data in question represents input data that is not exploitable or suitable for the processing program.

The annotations can be specified manually. By means of the training, a (given) learning algorithm can adjust model parameter values of the machine learning model using the training data. To this end, the learning algorithm comprises an optimization method and an objective function to be optimized, for example a reward function to be maximized or a loss function to be minimized. The loss function describes a deviation between an output of the machine learning model calculated for input training data with current model parameter values and the associated annotations. Depending on a current result of the loss function, the model parameter values are modified iteratively by means of the optimization method, e.g., by backpropagation and gradient descent. If an unknown input image is fed to the ready-trained machine learning model, it calculates an output therefrom which, put simply, corresponds to the annotation of the training data with which the input image has relevant similarities.

The training data can be labelled as suitable with a positive annotation or as unsuitable with a negative annotation, e.g., as a function of the noise level of the training data. A model can thereby be learned that carries out a classification between valid and unsuitable noise levels. Instead of or in addition to the noise level, annotations can also be assigned as a function of, e.g., a brightness, a brightness distribution or a contrast.

In order to determine labels for training data, the training data can be entered into the processing program. Processing results of the processing program can then be evaluated by assigning a positive or negative annotation, in particular manually.

If both the processing program and the checking program are formed by machine learning models, a part of the training data of the processing program can also form part of the training data of the checking program. This is expedient in particular in the case of unsupervised learning methods (e.g., for an anomaly detection) or for training data with a positive annotation.

Training data can also be generated by generating, from one or more images captured by a microscope, a plurality of images with different levels of interference or disturbances as training data. Different levels of interference can be added in particular in the form of different levels of noise. Alternatively, image processing can be used to generate different levels of underexposure or overexposure. The images generated in this manner can be used as training images. In particular, they can be entered into the processing program in order to subsequently assign a positive or negative annotation. Instead of the images captured by the microscope, it is also possible to use training images of an image processing program that comprises a machine learning model and to provide these images with different levels of interference, as described.

Optionally, a reason for a negative annotation can be indicated for a negative annotation of training data. The machine learning model thereby learns to determine a reason for the negative checking result in the event of an output of a negative checking result for input data or input microscope images. For example, an insufficient laser intensity can be indicated as the reason for excessive image noise. As described later on in greater detail, this enables an automated correction of processes. Compared to a verification of results of an image processing program, checking the input data makes it possible to determine a reason for the lack of suitability of the input data more reliably. For instance, if a segmenting image processing program outputs an erroneous segmentation mask due to a noisy input image, only the input image contains the information regarding the image noise, not the segmentation mask.

Consequences in the Event of a Negative Checking Result

In the event of a negative checking result, in particular one or more of the following actions can be performed:

A warning can be output to a user.

A workflow can be interrupted and a switch made to an alternative (fallback) workflow. For example, a workflow can provide that a microscope image is successively analyzed by a plurality of image processing programs and microscope components are subsequently controlled based on an analysis result, e.g., a sample stage is moved based on a sample type determined from the microscope image. This workflow can be interrupted and, instead, e.g., an illumination can be modified in order to capture a more suitable microscope image.

A request can be output to a user to enter an annotation or contextual data relating to the microscope image for use in a training process of a machine learning model. Problematic situations can thus help in the improvement of previous machine learning models. The machine learning model cited here can in particular be part of the image processing program or part of the checking program. For instance, a user can indicate in the form of an annotation that a microscope image classified with a negative checking result appears too dark or that an object depicted therein (e.g. a sample or sample carrier) appears in the wrong place. This information can be used in a subsequent training, whereby the checking program can learn to suggest a suitable correction in such cases.

The image regions due to which a negative checking result was generated can be highlighted. For example, the microscope image with a highlighted image region can be displayed to a user or saved for subsequent analyses.

A capture of a new microscope image with modified capture parameters can be suggested or carried out. Modified capture parameters can in particular be defined depending on a determined reason for the negative checking result.

Separate Evaluation of Image Regions

The checking program can be configured to check or evaluate different image regions of the microscope image separately from one another. It can be provided that only image regions for which a positive checking result is determined are to be transmitted to the image processing program. For instance, if an overview image is captured in which other objects besides the sample carrier are visible, e.g. an immersion device or a user's finger, it can be provided that only the image regions of the sample carrier are transmitted to the image processing program. If the latter is to perform, e.g., a classification according to sample carrier type, the image section transmitted in this manner can have a greater similarity with training images of the classifying image processing program, whereby more reliable results may be possible.

Alternatively or additionally, for image regions for which a negative checking result is determined, the capture of a new image with modified captured parameters can be suggested or carried out. For instance, the microscope image to be entered into the image processing program can be an image assembled from a plurality of partial images (tile scan). The capture of a new image or tile scan can now occur solely for an image region with a negative checking result. The selected region can be imaged with modified capture parameters in order to, e.g., achieve a better signal-to-noise ratio.

Plurality of Processing and Checking Programs

A plurality of image processing programs can be provided to process the microscope image in parallel or in sequence in relation to one another. In a sequential processing, the microscope image is input into a first image processing program and an output of the first image processing program is input into a second image processing program. For example, a segmentation mask which labels image areas of the sample carrier can first be calculated from an overview image of a sample carrier before being fed to a further image processing program, which infers spatial information of the sample carrier from a shape or position of the sample carrier in the segmentation mask. In a parallel configuration, in contrast, the microscope image is either fed to the plurality of image processing programs or one of the parallel image processing programs is selected within the framework of a control system. For example, different image processing programs can be implemented based on sample type or sample carrier type.

A respective checking program can be used as described for each of the image processing programs. The checking programs can differ with respect to the evaluation criterion depending on the associated image processing program, i.e. either with respect to the type of evaluation criterion (e.g. image noise or image brightness) or with respect to a limit value of the evaluation criterion (e.g. different image noise levels).

Verification after Processing

In the event of a positive checking result, the microscope image can be fed to the image processing program, which generates an image processing result from the microscope image, e.g. an output image. The image processing result can now be fed to a verification model, which is designed to check the plausibility of the image processing result. A display of the image processing result for a user or a transmission to another computer program only occurs in the event of a positive verification result. Both the input image and the output of the image processing program are thus checked in these embodiments. This can further increase reliability.

The verification model can be formed by a machine learning model trained with training data. The training data can comprise image processing results of the image processing program. For example, it can be manually annotated whether the image processing results appear correct or incorrect. This allows the verification model to learn to evaluate new image processing results accordingly.

Generating and Checking Training Images for a Machine Learning Program

The invention also relates to a microscopy system for generating and checking training images. The microscopy system comprises a microscope configured to capture raw data and a computing device configured to form at least one microscope image from the raw data and to incorporate/add said at least one microscope image in/to training images of a machine learning program. The computing device is further configured to first feed a microscope image to be incorporated in the training images to a checking program configured to check the supplied microscope image with respect to an evaluation criterion predefined for the machine learning program. In the event of a positive checking result, the microscope image is incorporated in the training images; in the event of a negative checking result, the microscope image is not incorporated in the training images.

The microscope image can be added to the training images either as an input image or as a target image ("ground truth"). It is also possible that one microscope image is to be incorporated in the training data as an input image and another microscope image is to be incorporated as a target image. In this case, the checking program can be designed to check both or alternatively only one of the microscope images. If both microscope images are checked, they can in principle be evaluated separately with different evaluation criteria for input and target images. Alternatively, both microscope images can be checked together, whereby an evaluation result can also depend on a relationship between these images.

In further variants, after the incorporation of the at least one microscope image into the training images, a training/learning process of the machine learning program is carried out. The term "machine learning program" can be understood as a synonym for a model or machine learning model learned using training data. In particular, the machine learning program can be structured and the training carried out as specified in the present description in relation to other learned models/machine learning models.

The variants of the invention described with reference to other embodiments of the invention can also be used for generating and checking training images for a machine learning program provided that the (image) processing program in these variants is replaced by the machine learning program. In this respect, the machine learning program can also be considered a specific embodiment of a processing program.

An advantage here is that a microscope user can add training images without it being necessary for the user to have a deeper understanding of requirements of machine learning processes. If a user tries to add unsuitable microscope images that would probably lead to substandard models, these can be intercepted by the checking program. An improved quality can likewise be ensured in the case of an automated training.

The machine learning program can be, for example, a model intended to map an input image to a representation of another contrast technique. This can be desirable, e.g., when microscope images are captured using a particular phase contrast technique and images displayed to the user are to resemble images generated using a DIC technique. The associated training images comprise input images of a particular phase contrast technique and target images of the same sample captured with a DIC slider. If a user is examining a sample genus that differs considerably from the samples of the training images, it can be advisable to supplement the training images with new images that correspond to the sample genus being examined. If the user now wants to add microscope images to the training images, these should meet various requirements. For instance, any image noise, in particular in a target image, should not be too high. The checking program can thus be designed to classify a microscope image as suitable or unsuitable depending on its image noise. A threshold of a maximum allowable image noise depends on the specific machine learning application. In the case of a machine learning program for an image-to-image mapping to another contrast technique, the checking program can also be designed to check the microscope images provided as the input image and the target image in order to verify that the same structures are depicted.

General Features

A microscopy system is understood to be an apparatus that comprises at least one computing device and a microscope. In principle, a microscope can be understood to be any measurement device with magnification capabilities, in particular a light microscope, an X-ray microscope, an electron microscope, a macroscope or an image-capturing device with magnification capabilities of some other design.

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphics processors. The computing device can also be configured to control the microscope camera, image capture, the sample stage drive and/or other microscope components.

An overview camera for capturing an overview image can be provided in addition to a sample camera with which images of a sample area are captured with a higher magnification. Alternatively, one and the same camera can be used, wherein different objectives or optical systems are used for the capture of an overview image and a more magnified sample image. A microscope image can be fed to the checking program immediately upon being captured by a camera or be calculated from one or more images in a first step before being fed to the machine learning model.

A computer program according to the invention comprises commands that cause the execution of one of the described method variants when the method variants are executed by a computer. The computer program can in particular comprise commands by means of which the processes described in relation to the computing device can be implemented.

The method according to the invention can check (screen or examine) in principle any input data. Different embodiments are described with reference to microscope images for the purposes of illustration. It is also possible to modify these example embodiments through the use of other—in principle any other—images or another type of data, e.g., audio, video, spectral or text data, instead of microscope images. In particular, input data can be captured by in principle any measuring devices or sensors or be derived from measurement values of the same.

Different example embodiments of the invention specify characteristics of a training process or training data. In this regard, variants of the invention are intended to comprise the conducting of a corresponding training process as well as the implementation of a model that has been ready trained in this manner (the training process no longer needing to be carried out) regardless of whether the described example embodiment describes characteristics of a ready-trained model or characteristics of the learning process.

While training methods based on supervised and unsupervised learning are described for the purposes of illustration, these variants can also be modified to implement a partially supervised training in which only a part of the training data is annotated. Alternatively, reinforcement learning is also possible.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 1:
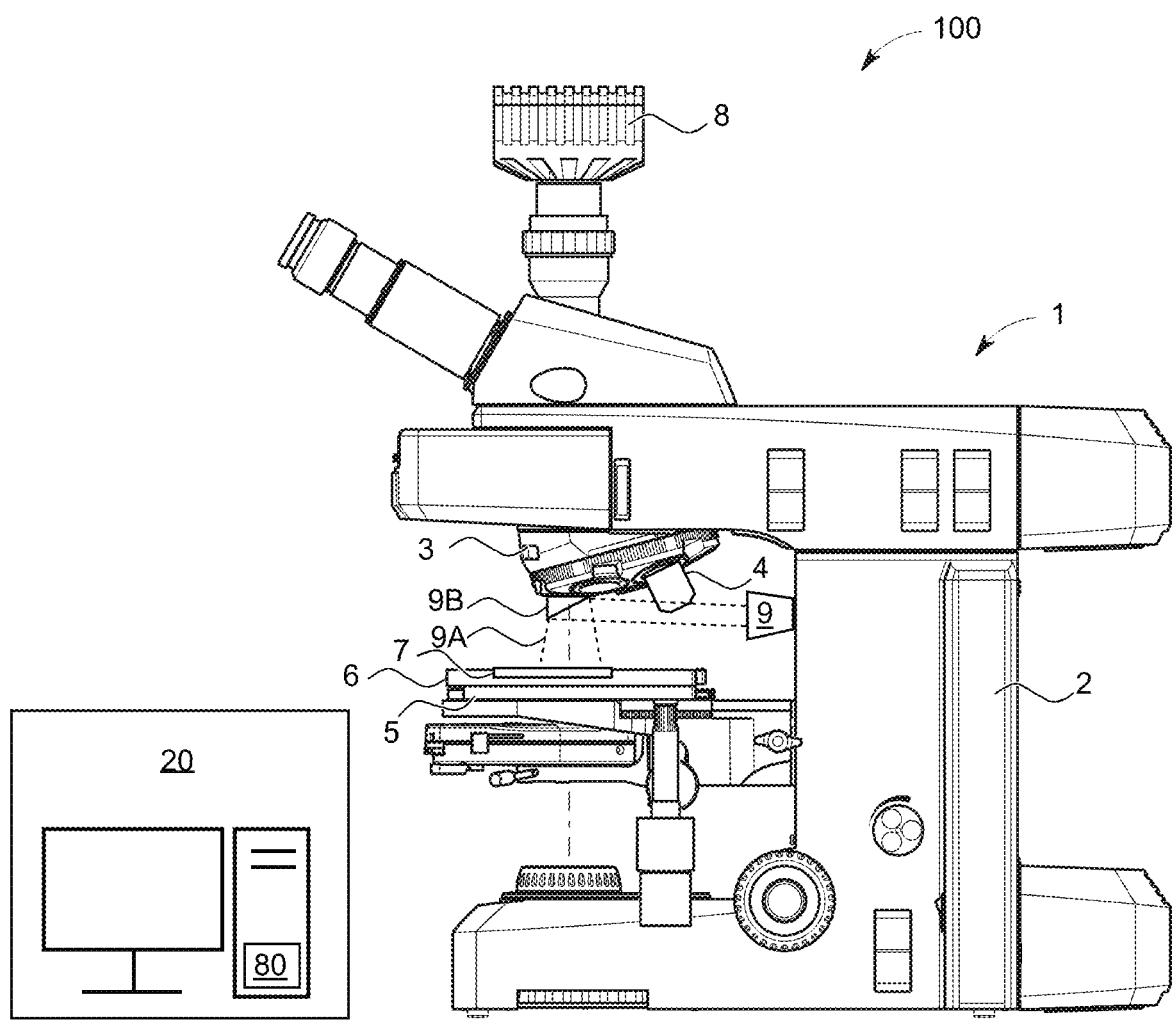
FIG. 1 is a schematic illustration of an example embodiment of a microscopy system of the invention.

Different example embodiments are described in the following with reference to the figures.
FIG. 1

FIG. 1 shows an example embodiment of a microscopy system 100 according to the invention. The microscopy system 100 comprises a computing device 20 and a microscope 1, which is a light microscope in the illustrated example, but which in principle can be any type of microscope. The microscope 1 comprises a stand 2 via which further microscope components are supported. The latter can in particular include: an objective changer/revolver 3, on which an objective 4 is mounted in the illustrated example; a sample stage 5 with a holding frame 6 for holding a sample carrier 7 and a microscope camera 8. If the objective 4 has been rotated so as to be located in the microscope light path, the microscope camera 8 receives detection light from one or more samples supported by the sample carrier 7 in order to capture a sample image. A sample can be any object, fluid or structure. The microscope 1 also comprises an overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 88 is arranged on the objective revolver 3 and can be selected instead of the objective 4. In variants of this embodiment, the mirror or some other deflection element can also be arranged at a different site. Alternatively, the overview camera 9 can also be arranged on the stand 2 so as to view the sample carrier 7 directly without a mirror 9B. In principle, it is also possible for the microscope camera 8 to function as an overview camera when a different objective, in particular a macro-objective, is selected via the objective revolver 3 for the capture of an overview image.

A microscope image can be understood in the present disclosure as an overview or sample image as described in the foregoing. The microscope image can correspond to captured raw data or be formed by means of a processing of the raw data. The computing device 20 comprises a computer program 80 with an (image) processing program for processing at least one microscope image. Processing programs are designed for particular use cases and can in particular generate erroneous results when used in other situations. For instance, if a microscope image contains too much image noise, a processing program can generate artefacts or fabricate image structures that were not in the original microscope image. Instead of displaying a falsified output image, it can be preferable not to output any result of the processing program or not to perform the calculations that result in falsified outputs in the first place. For a user, an indication of a violation of boundary conditions of the processing program can be more acceptable than the display of incorrectly processed images. If the result of the processing program is part of a larger automated process (comprising, for example, a sample segmentation followed by the scanning of sample areas or a slide classification for the purposes of collision prevention), an erroneous result could lead to lengthy and unnecessary follow-up actions and potentially serious damage.

Figure 2:
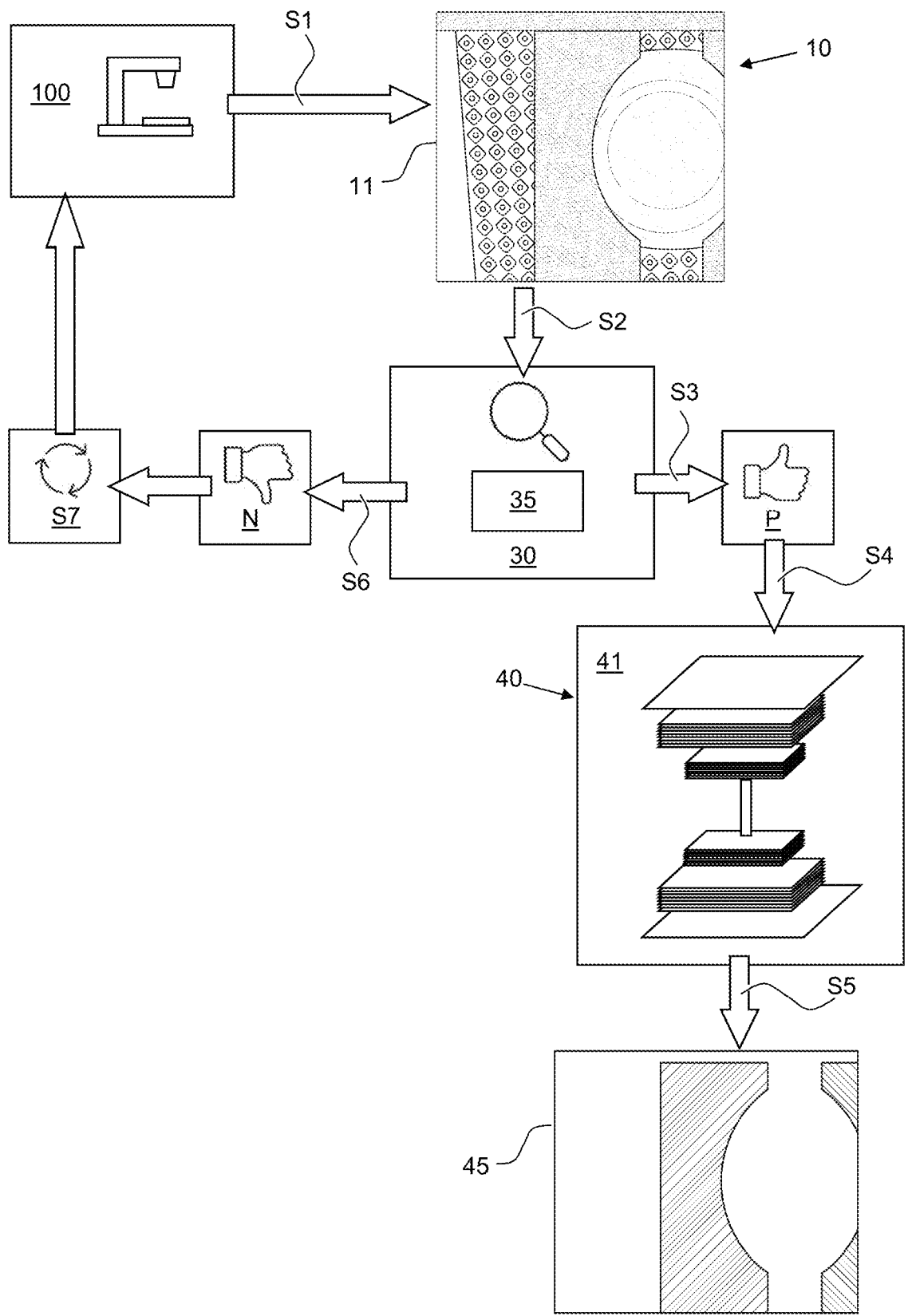
FIG. 2 shows schematically a process of an example embodiment of a method of the invention.
Figure 3:
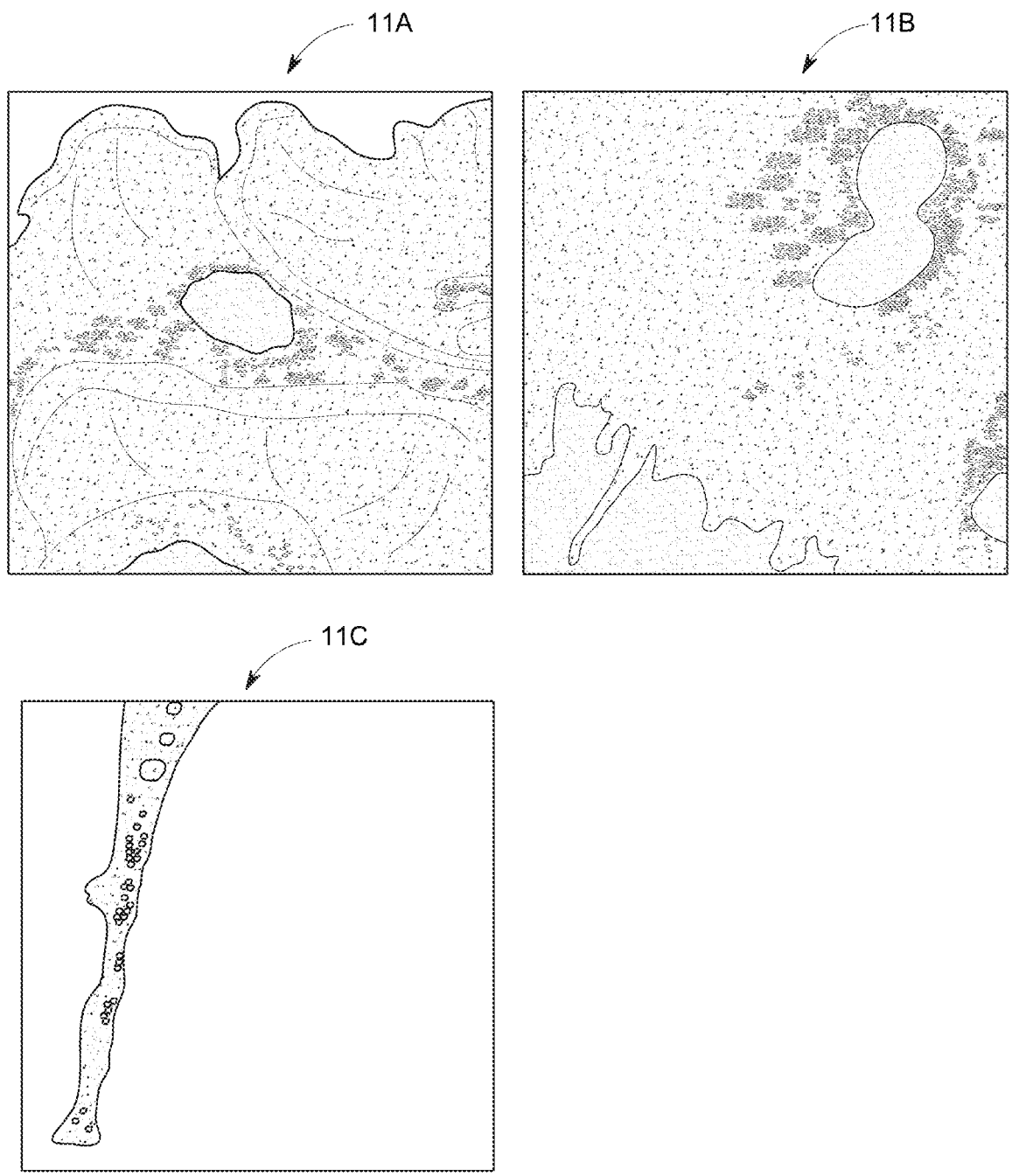
FIG. 3 shows schematically microscope images that are checked by the checking program of example embodiments of the invention.

In order to prevent these problems, the computing device 20 uses a checking program. The latter evaluates whether entering a microscope image into an image processing program makes sense or is likely to lead to an erroneous result. Processes of this checking are described in the following with reference to the further figures.
FIG. 2 and FIG. 3

FIG. 2 illustrates schematically processes of an example embodiment of a method of the invention. The processes can be implemented by means of the computing device of FIG. 1 and/or a computer program according to the invention.

In step S1, a microscope image 11 is received from a microscopy system 100. The microscope image 11 can be formed directly from captured raw data of the microscopy system or by means of a further processing of the raw data.

A microscope image 11 is an example of measurement data 10 that can generally be used in this example embodiment. Measurement data 10 can also be captured by other measuring devices and does not necessarily have to be image data. The microscope image 11 is described in the following for the purposes of illustration; this description can, however, also apply generally to the measurement data 10.

In step S2, the microscope image 11 is fed to a checking program 30. The checking program 30 evaluates a suitability of the microscope image 11 for further processing by a processing program 40 based on an evaluation criterion 35. The evaluation criterion 35 is selected depending on the processing program 40 and is intended to prevent the production and output of erroneous results by the processing program 40. The evaluation criterion 35 does not indicate whether it is in principle possible for the microscope image 11 to be processed by the processing program 40, but whether an erroneous result is likely.

If a positive checking result P is calculated (step S3), the input of the microscope image 11 into the processing program 40 follows in step S4. In the illustrated example, the processing program 40 is an image processing program 41, which in this case comprises a convolutional neural network (CNN) trained to segment an input image. The image processing program 41 accordingly calculates a segmentation mask/binary mask from the microscope image 11 as a processing result 45, which is output in step S5. In this example, the segmentation mask shows two holding frame parts between which a sample carrier can be held. The convolutional neural network is accordingly trained to detect, pixel by pixel, which image areas of an input image/microscope image 11 show a part of a holding frame and which pixels belong to other image content. In order for this detection to work correctly, the microscope image 11 must meet different criteria, which can be estimated by means of the evaluation criterion 35. The evaluation criterion 35 can relate to, for example, an upper limit for image noise. Only if the checking program 30 determines that the image noise of the microscope image 11 is below the upper limit do steps S4 and S5 follow. Additionally or alternatively, the evaluation criterion can be defined via an edge determination. If too many edges or edges of an insufficient length are found in the microscope image 11, it is likely that the outer edges of the holding frame parts cannot be correctly determined by the image processing program 41 either. As a further evaluation criterion 35, alternatively or additionally, it is possible to look for image artefacts, e.g. reflections or shadows, due to which a larger area of the microscope image 11 is not detectable or has a contrast below a predefined threshold value. It can likewise be assumed in these cases that the image processing program 41 would not provide a correct result or is very unlikely to provide a correct result.

If a negative checking result N is determined by the checking program 30 (step S6), the workflow is interrupted via the image processing program 40. Instead, a warning can be output to a user. In the example shown, the capture of a new microscope image is additionally suggested or prescribed in step S7. Capture parameters are modified for the capture of the new image. If, for example, the negative checking result N indicates that a level of image noise is too high, an illumination intensity or exposure time can be increased as the modified capture parameter.

The checking program 30 can in particular be or comprise a machine learning model. In addition to the aforementioned evaluation criteria, a machine learning model can also efficiently analyze whether the microscope image 11 deviates too much from known images, contains particular (undesired) image content or is missing particular (desired) image content. FIG. 3 illustratively shows microscope images 11A-11C, wherein microscope image 11A shows sample structures that can be detected as suitable for the processing program by the machine learning model of the checking program. In contrast, microscope image 11B is intended to represent a case of a noise level that is too high, based on which the machine learning model of the checking program can estimate that the processing program will not detect the sample structures correctly. The microscope image 11C shows a different type of sample structure, which is detected by the checking program as a novel/unknown type for which the processing program is not designed. How suitable machine learning models of a checking program can be designed is described in greater detail with reference to the following figure.

FIG. 4

Figure 4:
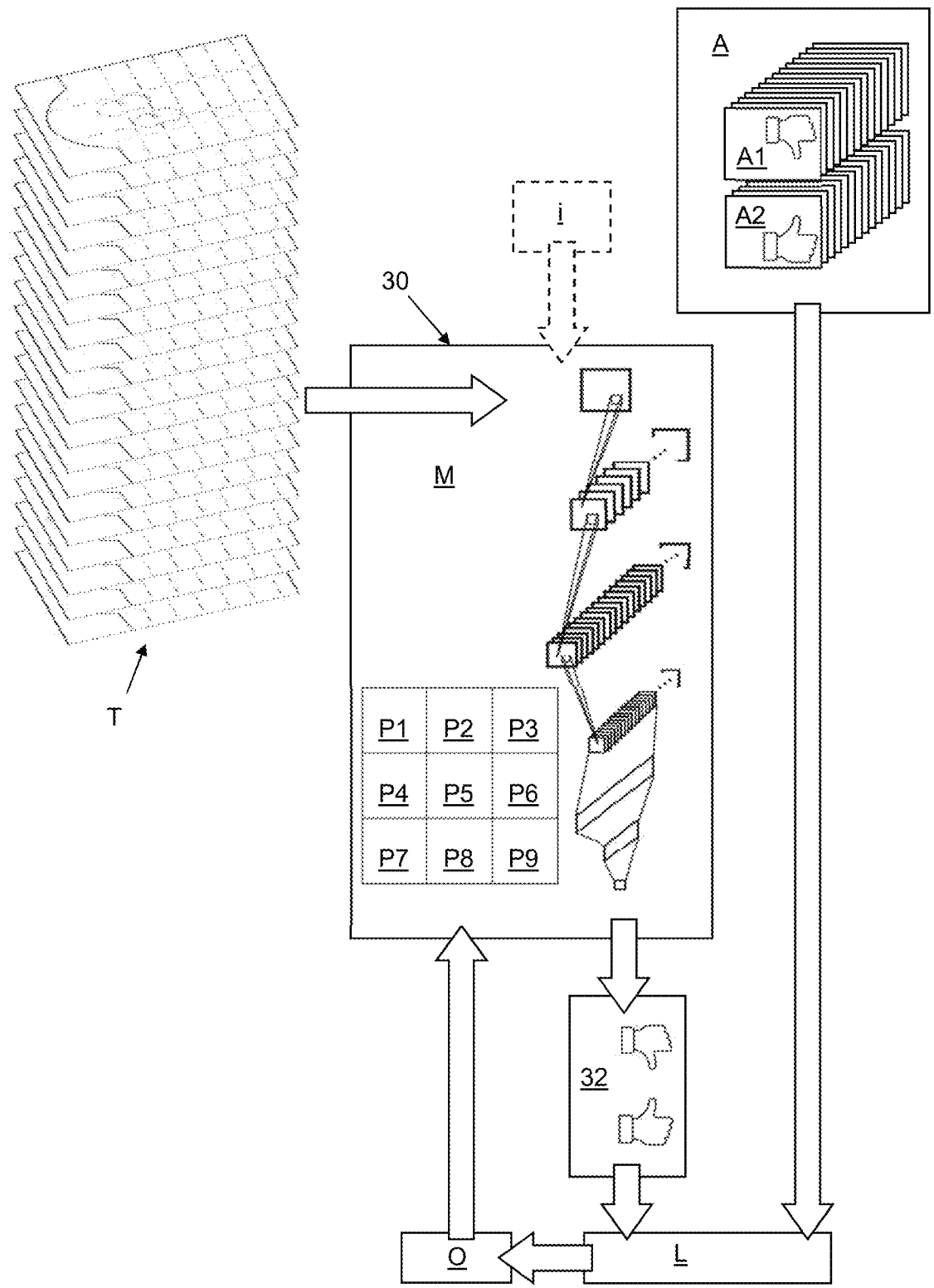
FIG. 4 shows schematically a training process for a machine learning model of example embodiments of the invention.

FIG. 4 illustrates a training process of a machine learning model M, which illustratively constitutes the checking program 30. In the illustrated case, the machine learning model M comprises a deep neural network, e.g., in the architecture of a convolutional neural network. A plurality of convolutional layers successively calculate convolutions between the input data and respective convolution matrices or filter kernels, of which one is illustrated by way of example with model parameter values P1-P9. Other layers, e.g. pooling and activation layers, can be inserted between and after the convolutional layers in a known manner.

The illustrated training represents a supervised learning process for which training data T with an associated annotation A is provided. The training data T comprises a plurality of microscope images for which a negative annotation A1 or a positive annotation A2 is respectively defined as an annotation A. A negative annotation A1 indicates that the corresponding microscope image of the training data T is not suitable for the image processing program. Accordingly, a positive annotation A2 indicates a suitability of the corresponding microscope image of the training data T for the image processing program. Model parameter values P1-P9 are adjusted iteratively in the training. Based on current model parameter values P1-P9, the machine learning model M calculates an output 32 for each image of the training data T. In this example, the machine learning model M is designed for classification and outputs one of two possible values for an entered image, corresponding to a negative or a positive annotation. A loss function L detects a difference between the outputs 32 and the specified annotations A. Based on the loss function L, a predefined optimization function O determines how to modify the model parameter values P1-P9 in order to minimize the loss function L. Upon completion of the training, the machine learning model M is able to output a classification corresponding to the annotations A, i.e. indicating either a suitability or a lack of suitability for processing by the processing program, for an unknown microscope image that lies within a statistical distribution of the training data T.

Optionally, contextual data i can also be taken into account in the learning process. This can be known information relating to the respective images of the training data T, e.g. an indication of a contrast technique or a depicted sample or sample carrier type. After the training, the machine learning model M is thus able to take into account available contextual data relating to a new microscope image 11.

An evaluation criterion is expressed in the machine learning model M by the model parameter values P1-P9. In order to apply the evaluation criteria described with reference to FIG. 2, e.g. the annotations A can be selected accordingly so that, for example, training images with high image noise levels are assigned a negative annotation A1.

How further evaluation criteria can be implemented by means of the model parameter values P1-P9 is explained with reference to the following figure relating to an unsupervised learning process of the machine learning model M.

FIG. 5

Figure 5:
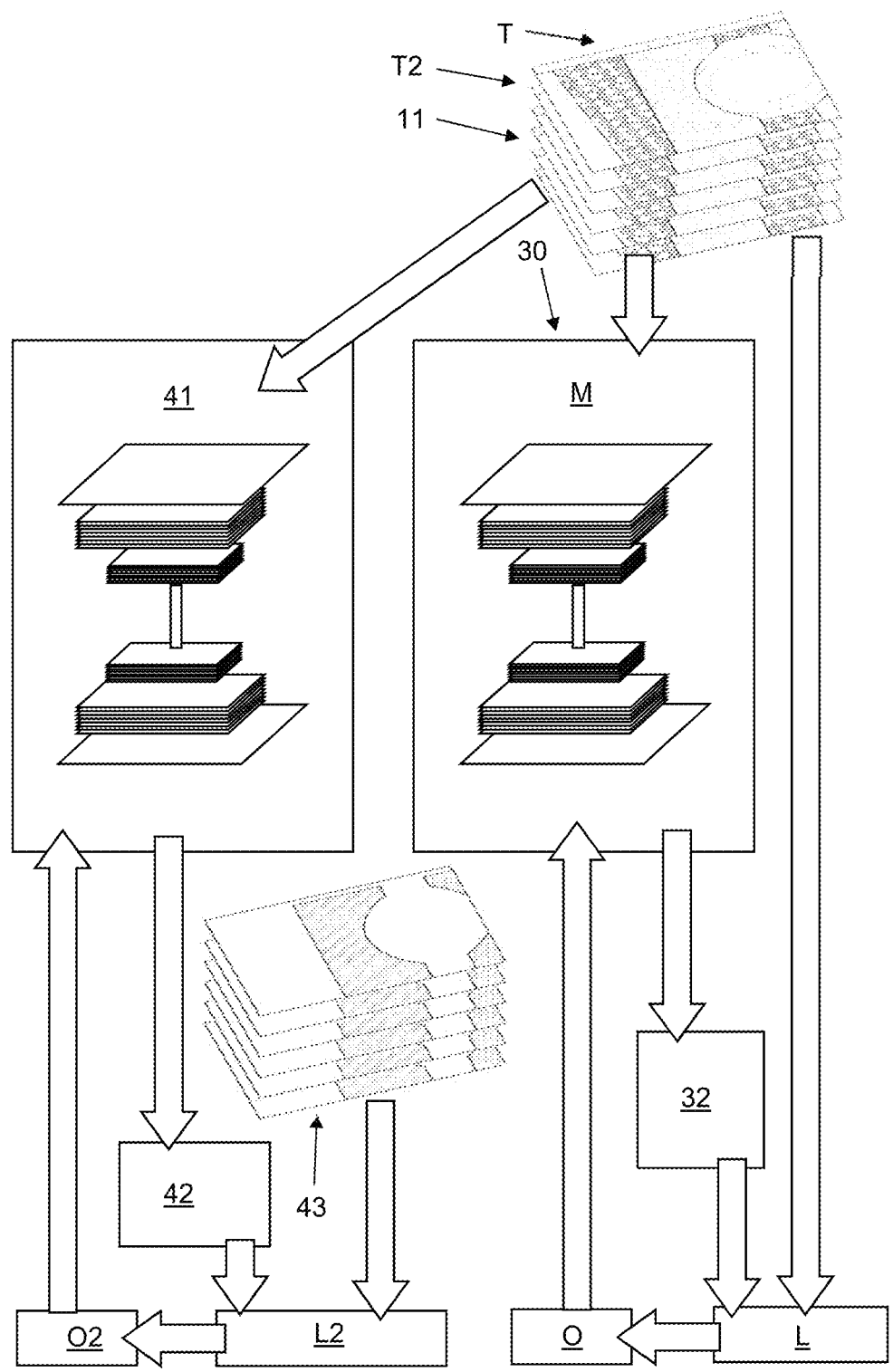
FIG. 5 shows schematically a further training process of example embodiments of the invention.

FIG. 5 illustrates a supervised learning process for an image processing program 41 comprising a machine learning model on one side and an unsupervised learning process for the machine learning model M of the checking program 30 on the other.

The training of the image processing program 41 is discussed first. A plurality of microscope images 11 are provided as training data T2 with associated target data 43. If the image processing program 41 is to learn a segmentation, corresponding segmentation masks can be predefined as target data 43. The image processing program 41 calculates outputs 42 for input training data T2 with its current model parameter values. A loss function L2 to be minimized captures a difference between the outputs 42 and the target data 43. As a function of the loss function L2, an optimization function O2 iteratively adjusts the model parameter values of the image processing program 41, for example via a gradient descent method.

The ready-trained image processing program 41 is thereby able to carry out a correct segmentation of unknown microscope images that resemble the training data T2.

The same training data T2 or a part of the same can now also be used as training data T for the checking program 30. The machine learning model M of the checking program 30 is designed illustratively as an autoencoder in this case. It does not utilize the target data 43 of the image processing program 41. Instead, the machine learning model M is trained to generate outputs 32 that resemble the inputs, i.e. the training data T, as closely as possible. The loss function L to be minimized captures differences between the outputs 32 and the training data T. The optimization function O iteratively adjusts the model parameter values of the machine learning model M by means of the loss function L. The ready-trained autoencoder can now be used as part of the checking program 30. The autoencoder calculates, from a microscope image to be checked, an output which should resemble the input microscope image. A difference between the output and the input of the autoencoder is captured and quantified. If the difference is small, e.g. smaller than a predefined threshold value, this indicates that the input microscope image resembles the training data T or lies within a statistical distribution of the training data T. As this training data was also used at least partially for the training of the image processing program 41, it can be inferred that the image processing program 41 is also (in addition to the autoencoder) able to process the microscope image in question properly. The checking program 30 thus outputs a positive checking result in this case. If, on the other hand, an output of the autoencoder differs considerably from an input microscope image, the latter is probably an alien microscope image that was not taken into account sufficiently for the training of the autoencoder (and image processing program 41). The checking program 30 thus outputs a negative checking result in this case.

The checking program 30 with the described autoencoder thus implements the evaluation criterion of whether a microscope image to be checked resembles known microscope images to an adequate degree. Instead of an autoencoder, it is also possible to use other model designs for anomaly detection.

FIG. 6

Figure 6:
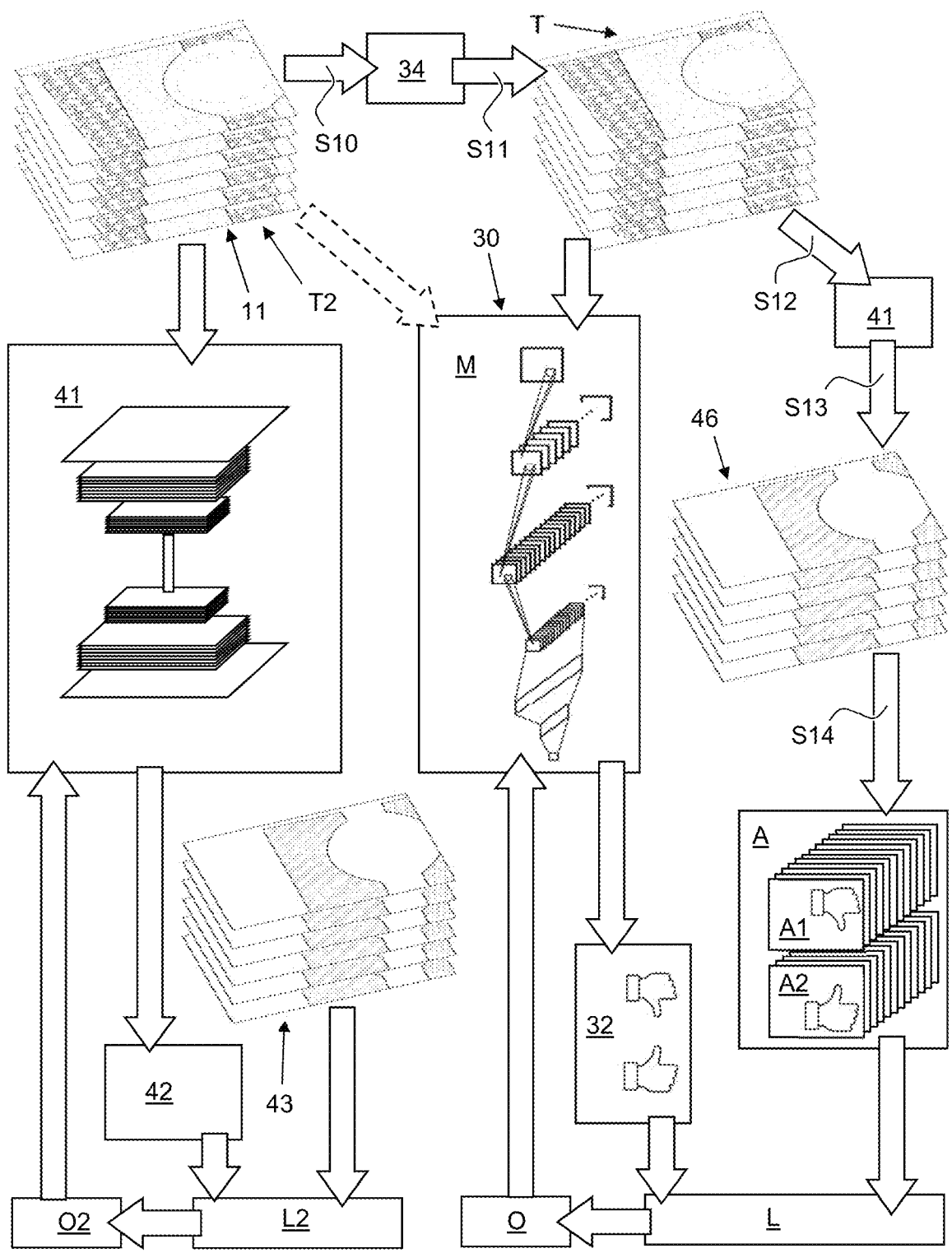
FIG. 6 shows schematically a further training process of example embodiments of the invention.

FIG. 6 illustrates further training processes. As in the previous figure, a supervised learning process for the image processing program 41 is shown.

In contrast to the previous figure, however, the machine learning model M of the checking program 30 in this case is not trained by means of an unsupervised learning process, but by a supervised learning process.

At least some of the microscope images 11 forming the training data T2 of the image processing program 41 are input into an interference program 34 in step S10. The interference program 34 adds interference to the microscope images 11, e.g., noise can be superimposed, JPEG compression artefacts can be generated via JPEG compression, the image resolution can be reduced or the brightness or the image contrast can be reduced. Different degrees of interference can be added so that a plurality of images with, e.g., noise levels of different magnitudes are generated from a single microscope image 11 in step S11. The images generated in this manner constitute training data T (or a part of training data T). The training data T is now input into the ready-trained image processing program 41 (step S12), which outputs image processing results 46 (step S13). The latter are segmentation masks in the present example. The segmentation masks can now be evaluated with regard to their quality (step S14), e.g. manually by a user. Either negative annotations A1 or positive annotations A2 are assigned as annotations A in this step. These are assigned to the corresponding images of the training data T (not, for example, to the image processing results 46). As a result, training data T with varying degrees of interference is available, wherein the annotations respectively indicate whether the image processing program 41 can still calculate an adequate result for the degree of interference in question.

The training data T is now used with the annotations A for a supervised training of the machine learning model M of the checking program 30. The training process can occur in the manner described with reference to FIG. 4.

Optionally, some or all of the microscope images 11 of the training data T2 to which interference was not added can also be used as training data of the machine learning model M of the checking program 30. A positive annotation A2 can be assumed for the microscope images 11 in this scenario since these microscope images 11 were used as part of the training data T2 of the image processing program 41 and should thus be readily processable by the ready-trained image processing program 41. Alternatively, the microscope images 11 as well as the training data T can first be entered into the ready-trained image processing program 41 and annotated manually.

By incorporating training data T2 of the image processing program 41 in the training of the checking program 30, the checking program 30 can be updated easily in the event of a modification of the image processing program 41 (for example, in the event of an augmentation of its training data): the updating of the checking program 30 in this scenario can in fact be achieved simply by means of a new training run and does not require any manual reprogramming.

FIG. 7

Figure 7:
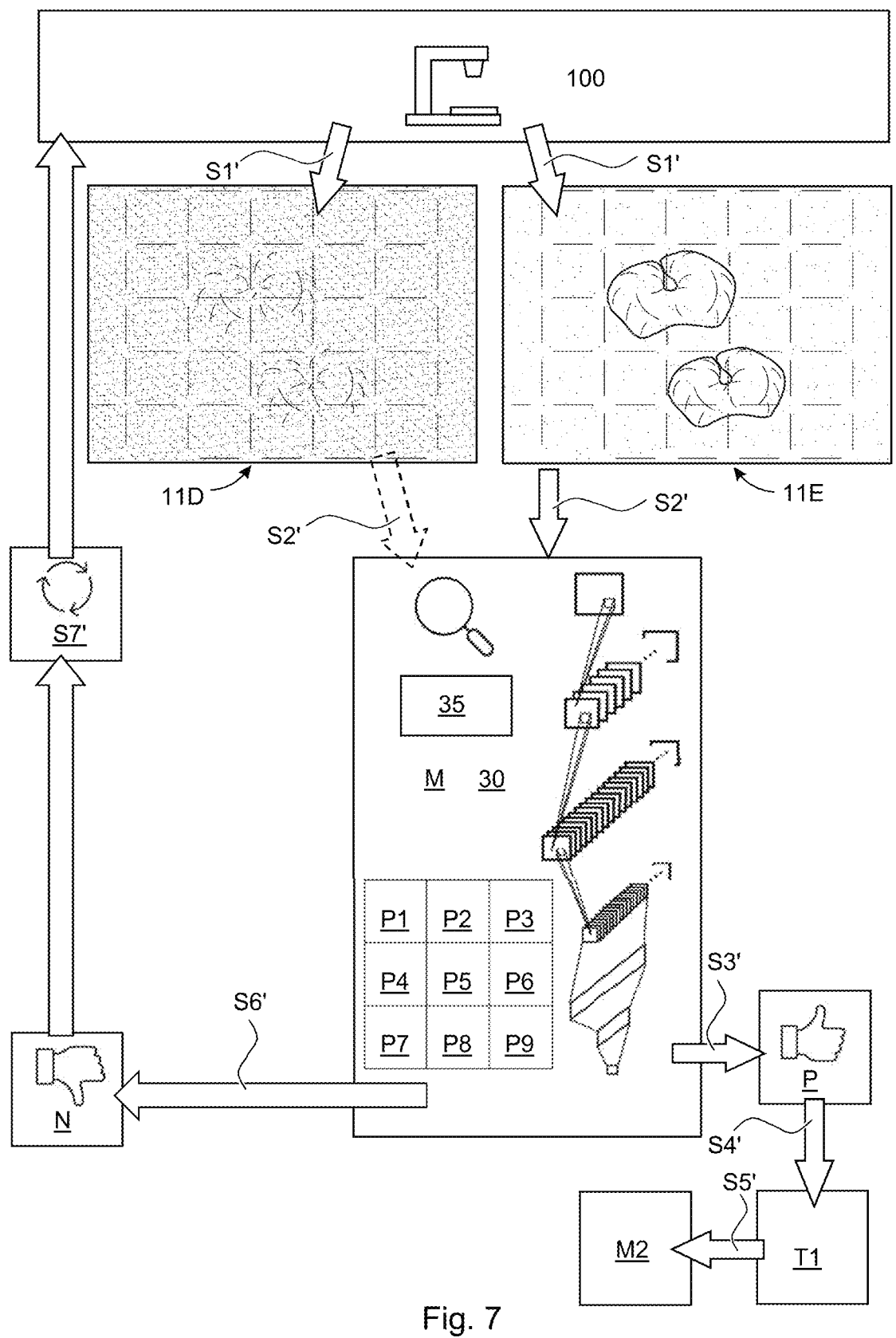
FIG. 7 shows schematically a process of a further example embodiment of the invention.

FIG. 7 shows a process of a further illustrative method of the invention by means of which microscope images are generated and checked as training images for a machine learning program. The microscopy system of FIG. 1 can be configured to execute this method.

In step S1', at least one microscope image 11D, 11E is captured with a microscopy system 100, or raw data is captured from which at least one microscope image 11D, 11E is formed. In the example shown, two microscope images 11D, 11E are captured, which are intended to become training images T1 for a machine learning program M2. Both microscope images 11D and 11E are captured with the same field of view and thus show the same scene, in this example a biological sample. The microscope image 11D is captured with a first (low) illumination intensity, while the microscope image 11E is captured with a second, higher illumination intensity. In principle, it is also possible to use a longer exposure time instead of a higher illumination intensity. The microscope image 11E thus has less image noise than the microscope image 11D. The microscope image 11D can be used as an input image of training images of a machine learning program and the microscope image 11E can be used as an associated target image. By means of such training images, a machine learning program can be trained to calculate a noise reduction for input images. For a high-quality model to be learned, image noise levels of the input images and the target images must not be too high. A limit value for a still acceptable noise level is higher for input images than for target images.

Before existing training images of the machine learning program are supplemented with the microscope images 11D and 11E, at least one of them is fed separately or both of them are fed together to a checking program 30 in step S2'. The checking program 30 can in principle be designed as in preceding example embodiments. In particular, it can be designed as a machine learning model M in which an evaluation criterion 35 is defined by the values of model parameters P1-P9 determined in a training of this machine learning model M. The machine learning model M can be trained, for example, with pairs of images corresponding to the two microscope images 11D and 11E (i.e. two images of the same scene with different image noise levels), wherein a positive or negative evaluation is specified in the form of an annotation for each pair of images. These annotations can be, e.g., specified manually by an expert.

The checking program 30 is thus designed to output, for an input pair of microscope images 11D, 11E, either a positive checking result P in step S3' or a negative checking result N in step S6'. In the event of a positive checking result P, the microscope images 11D, 11E are incorporated in training images T1 of the machine learning program in step S4'. Thereupon, in step S5', a predefined learning algorithm can use the training images T1 to learn a model that constitutes the machine learning program M2.

In the event of a negative checking result N, on the other hand, a warning can be output to a user and/or, as in the illustrated example, the capture of new microscope images with modified capture parameters is prescribed in step S7'. For instance, if the microscope image 11E is too noisy, an increased illumination intensity can constitute the modified capture parameter.

In a variation of this embodiment, only the microscope image 11E which is to become a target image of the training data T1 is checked by the checking program 30 in order to determine whether an image noise level is low enough. The training of the machine learning model M of the checking program 30 in this scenario can occur as described with reference to FIG. 4. In the case of a pair of images to be checked consisting of the microscope images 11D and 11E, the training of FIG. 4 can be modified so that the images of a pair are always entered together and mapped to an output 32, wherein an annotation A is specified for each pair of images. A similar training can occur for the machine learning program M2, wherein, instead of the training data T, the microscope image 11D is used as an input image while the microscope image 11E is used, instead of the annotations A, as a target image.

The specific examples shown in the figures were chosen for the purposes of illustration. These examples are purely illustrative and variations are possible within the scope of the attached claims and general description. A noise reduction by means of the machine learning program of FIG. 4 is just an example of what can in principle be any kind of image-to-image mapping. It is also possible to use other evaluation criteria besides image noise, as described in relation to other embodiments. The image processing program can also be designed for other types of processing than a segmentation. It is also possible to use other images instead of microscope images. The machine learning models shown for the purposes of illustration can be designed or supplemented by means of other architectures. Further variant embodiments result when other data are checked and processed instead of (microscope) images. With sequential data, for example, the machine learning model can use a different architecture instead of the CNN shown, for example in the form of an RNN (recurrent neural network). The described processing or method steps do not have to follow each other directly. Instead, it is also possible to add intermediate steps or processing steps, for example for the preparation of images.

The described embodiments significantly reduce the risk of entering data into a processing program which is unsuitable for the data.

LIST OF REFERENCE SIGNS

1 Microscope
2 Stand
3 Objective revolver
4 Microscope objective
5 Sample stage
6 Holding frame
7 Sample carrier
8 Microscope camera
9 Overview camera
9A Field of view of the overview camera
9B Mirror
10 Measurement data
11 Microscope image
11A-11E Microscope images
20 Computing device
30 Checking program
32 Output of the checking program
34 Interference program
35 Evaluation criterion
40 Processing program
41 Image processing program
42 Output of the processing program
43 Target data in the training of a machine learning model of the processing program
45, 46 (Image) processing results of the processing program
80 Computer program
100 Microscopy system
A Annotations
A1 Negative annotation
A2 Positive annotation i Contextual data
L Loss function
M Machine learning model
M2 Machine learning program
N Negative checking result
O Optimization function
P Positive checking result
P1-P9 Model parameter values
S1-S14 Steps of method variants of the invention
S1-S7' Steps of method variants of the invention
T Training data
T1 Training images of the machine learning program M2

What is claimed is:

1. A microscopy system comprising:
a microscope configured to capture raw data; and
a computing device configured to form at least one microscope image from the raw data and to run a processing program for processing the microscope image;
wherein the computing device is further configured to first supply a microscope image which is to be processed with the processing program to a checking program executing on at least one of the computing device or a second computing device;
wherein the checking program, when executed on the at least one of the computing device or the second computing device, is configured to:
  check the supplied microscope image with respect to an evaluation criterion predefined for the processing program, wherein the checking program determines a deviation of the microscope image from known microscope images as a measure of resemblance between the microscope image and training data used for training the processing program for the evaluation criterion;
  transmit the microscope image to the processing program in the event of a positive checking result; and
  not transmit the microscope image to the processing program in the event of a negative checking result, wherein the checking program does not transmit the microscope image to the processing program if the deviation indicates that the microscope image falls outside a statistical distribution of the training data used for training the processing program.

2. A method for checking input data, comprising:
a first computing device supplying measurement data to be processed with a processing program to a checking program executing on at least one of the first computing device or a second computing device, the measurement data including a microscope image,
wherein, when executed on the at least one of the computing device or the second computing device, the checking program:
  checks the supplied measurement data with respect to an evaluation criterion predefined for the processing program, wherein the checking program determines a deviation of the microscope image from known microscope images as a measure of resemblance between the microscope image and training data used for training the processing program for the evaluation criterion;
  transmits the measurement data to the processing program in the event of a positive checking result; and
  does not transmit the measurement data to the processing program in the event of a negative checking result, wherein the checking program does not transmit the microscope image to the processing program if the deviation indicates that the microscope image falls outside a statistical distribution of the training data used for training the processing program.

3. The method according to claim 2,
wherein the processing program is an image processing program, and
wherein the evaluation criterion takes into account one or more of the following aspects: image noise, image brightness, and an illumination distribution.

4. The method according to claim 3,
wherein the evaluation criterion additionally takes into account one or more of the following aspects:
presence of artefacts in the microscope image; and
missing structures in the microscope image.

5. The method according to claim 3,
wherein the checking program also takes into account contextual data regarding the microscope image together with the microscope image.

6. The method according to claim 3,
wherein the checking program checks image regions of the microscope image separately from one another and only transmits image regions for which a positive checking result is determined to the image processing program.

7. The method according to claim 3,
wherein the checking program checks image regions of the microscope image separately from one another and, for image regions for which a negative checking result is determined, carries out or suggests a new image capture with modified capture parameters.

8. The method according to claim 3,
wherein a plurality of image processing programs are provided to process the microscope image in parallel or in sequence in relation to one another,
wherein a respective checking program is used for each of the image processing programs and the checking programs differ with respect to their respective evaluation criteria depending on the associated image processing program.

9. The method according to claim 3,
wherein, in the event of a positive checking result, the image processing program generates an image processing result from the microscope image,
wherein the image processing result is fed to a verification model designed to check a plausibility of the image processing result.

10. The method according to claim 9,
wherein the verification model is formed by a machine learning model trained with training data comprising the image processing results of the image processing program.

11. The method according to claim 2,
wherein the checking program comprises a machine learning model, wherein the evaluation criterion is defined by model parameter values of the machine learning model based on training data.

12. The method according to claim 11,
wherein the machine learning model is designed as an anomaly detector, a one-class classifier or an autoencoder and is trained in an unsupervised training using training data, wherein all training data constitute suitable input data for the processing program.

13. The method according to claim 11,
wherein the machine learning model is trained or has been trained in a supervised training using training data, wherein a part of the training data is labelled with a positive annotation indicating that the training data in question represents suitable input data for the processing program, and wherein another part of the training data is labelled with a negative annotation indicating that the training data in question does not represent suitable input data for the processing program.

14. The method according to claim 13, wherein a reason is additionally indicated for each negative annotation of training data, whereby the machine learning model learns to provide a reason for the negative checking result in the event of a negative checking result.

15. The method according to claim 11, wherein training data is labelled with a positive annotation or a negative annotation as a function of a noise level, a brightness, a brightness distribution or a contrast of said training data.

16. The method according to claim 15, wherein, in order to determine annotations for the training data, the training data is first entered into the processing program and positive or negative annotations are then assigned via an evaluation of processing results of the processing program.

17. The method according to claim 11, wherein training data is generated by respectively generating a plurality of images with different levels of interference as training data from one or more images captured by a microscope, by adding different levels of noise or by setting different levels of underexposure or overexposure via image processing.

18. The method according to claim 11, wherein the checking program or machine learning model determines whether predefined image content known to be unsuitable for the image processing program is contained in the microscope image and outputs a negative checking result when the predefined image content is detected in the microscope image.

19. The method according to claim 2, wherein, in the event of a negative checking result, one or more of the following actions are performed:
outputting a warning to a user;
interrupting a workflow and switching to a fallback workflow;
outputting a request to a user to enter an annotation for use in a training process of a machine learning model;
highlighting image regions due to which the negative checking result was generated;
suggesting or carrying out a new capture of a microscope image with modified capture parameters depending on a determined reason for the negative checking result.

20. A non-transitory computer-readable medium comprising a computer program with commands which, when executed by a computer, cause the execution of the method according to claim 2.

21. A microscopy system for generating and checking training images comprising:
a microscope configured to capture raw data; and
a computing device configured to form at least one microscope image from the raw data and to incorporate the at least one microscope image in training images of a machine learning program,
wherein the computing device is configured to first supply a microscope image to be incorporated in the training images to a checking program executing on at least one of the computing device or a second computing device;
wherein the checking program, when executed on the at least one of the computing device or the second computing device, is configured to:
check the supplied microscope image with respect to an evaluation criterion predefined for the machine learning program, wherein the checking program determines a deviation of the microscope image from known microscope images for the evaluation criterion;
incorporate the microscope image in the training images in the event of a positive checking result; and
not incorporate the microscope image in the training images in the event of a negative checking result, wherein the checking program does not incorporate the microscope image in the training images if the deviation is above a predefined degree.

22. The microscopy system according to claim 21, wherein the computing device is configured to incorporate the microscope image as an input image or as a target image in the training images and to conduct a training of the machine learning program with the training images.

* * * * *